(12) United States Patent
Kohn

(10) Patent No.: US 9,244,340 B2
(45) Date of Patent: Jan. 26, 2016

(54) METHOD FOR OPERATING A SENSOR SYSTEM AND SENSOR SYSTEM

(75) Inventor: Oliver Kohn, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1141 days.

(21) Appl. No.: 13/149,481

(22) Filed: May 31, 2011

(65) Prior Publication Data

US 2011/0290020 A1  Dec. 1, 2011

(30) Foreign Application Priority Data

Jun. 1, 2010 (DE) .......................... 10 2010 029 565

(51) Int. Cl.
| | |
|---|---|
| G01C 19/00 | (2013.01) |
| G03B 37/02 | (2006.01) |
| G06F 1/16 | (2006.01) |

(52) U.S. Cl.
CPC .............. *G03B 37/02* (2013.01); *G06F 1/1626* (2013.01); *G06F 1/1694* (2013.01); *G06F 2200/1614* (2013.01); *G06F 2200/1637* (2013.01)

(58) Field of Classification Search
CPC ..... G03B 37/02; G06F 1/1626; G06F 1/1694; G06F 2200/1637
See application file for complete search history.

(56) References Cited

U.S. PATENT DOCUMENTS

| | | | |
|---|---|---|---|
| 3,640,137 A * | 2/1972 | Allen et al. ...................... 74/5.34 |
| 6,453,743 B1 * | 9/2002 | Royle et al. ................. 73/504.12 |
| 7,451,549 B1 | 11/2008 | Sodhi et al. |
| 2003/0103038 A1 * | 6/2003 | Wong et al. .................... 345/158 |
| 2003/0231189 A1 * | 12/2003 | Williams ....................... 345/659 |
| 2006/0019614 A1 * | 1/2006 | Yamasaki .................... 455/90.2 |
| 2006/0273958 A1 * | 12/2006 | Ivanov et al. ................. 342/359 |
| 2008/0269988 A1 * | 10/2008 | Feller et al. ..................... 701/41 |
| 2009/0007661 A1 * | 1/2009 | Nasiri et al. ............... 73/504.03 |
| 2009/0026074 A1 | 1/2009 | Iyengar |
| 2009/0064781 A1 * | 3/2009 | Ayazi et al. ................ 73/504.12 |
| 2009/0071247 A1 * | 3/2009 | Konaka ..................... 73/504.14 |
| 2009/0125196 A1 * | 5/2009 | Velazquez et al. .............. 701/50 |
| 2009/0153401 A1 * | 6/2009 | Eitan et al. .................... 342/450 |
| 2009/0262074 A1 * | 10/2009 | Nasiri et al. .................. 345/158 |
| 2009/0265671 A1 * | 10/2009 | Sachs et al. ................... 715/863 |
| 2010/0033424 A1 * | 2/2010 | Kabasawa et al. ............ 345/156 |
| 2010/0129068 A1 * | 5/2010 | Binda et al. ..................... 396/50 |
| 2011/0314912 A1 * | 12/2011 | Kho et al. .................. 73/504.12 |
| 2013/0321167 A1 * | 12/2013 | Kohn et al. ............. 340/870.01 |

FOREIGN PATENT DOCUMENTS

| | | | |
|---|---|---|---|
| DE | 195 19 488 | 10/2005 | |
| EP | 0 556 666 | 8/1993 | |
| EP | 556666 B1 * | 4/1999 | .............. G03B 5/00 |
| JP | 2002164987 A * | 6/2002 | .............. H04M 1/21 |
| WO | WO 0179862 A1 * | 10/2001 | ................ G01P 9/04 |

* cited by examiner

*Primary Examiner* — Laura Martin
*Assistant Examiner* — Samir M Shah
(74) *Attorney, Agent, or Firm* — Kenyon & Kenyon LLP

(57) ABSTRACT

A method for operating a sensor system that includes a rotation rate sensor and an electronic component includes generating, by the rotation rate sensor, a sensor signal as a function of a rotation rate measured about a rotational axis, comparing the sensor signal to at least one first threshold value, and, for controlling the electronic component, outputting an interrupt signal to the electronic component as a function of the comparison of the sensor signal and the at least one first threshold value.

11 Claims, 3 Drawing Sheets

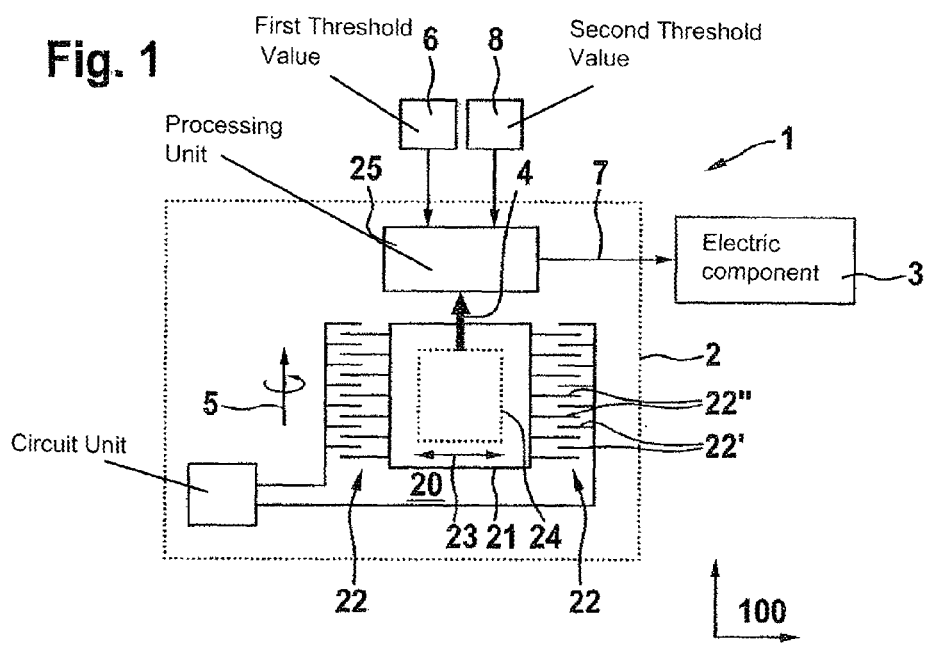
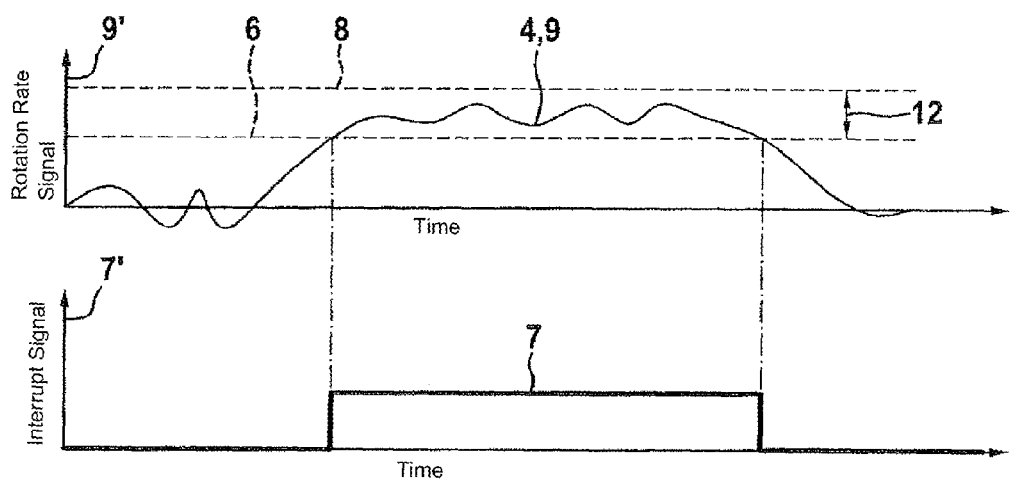

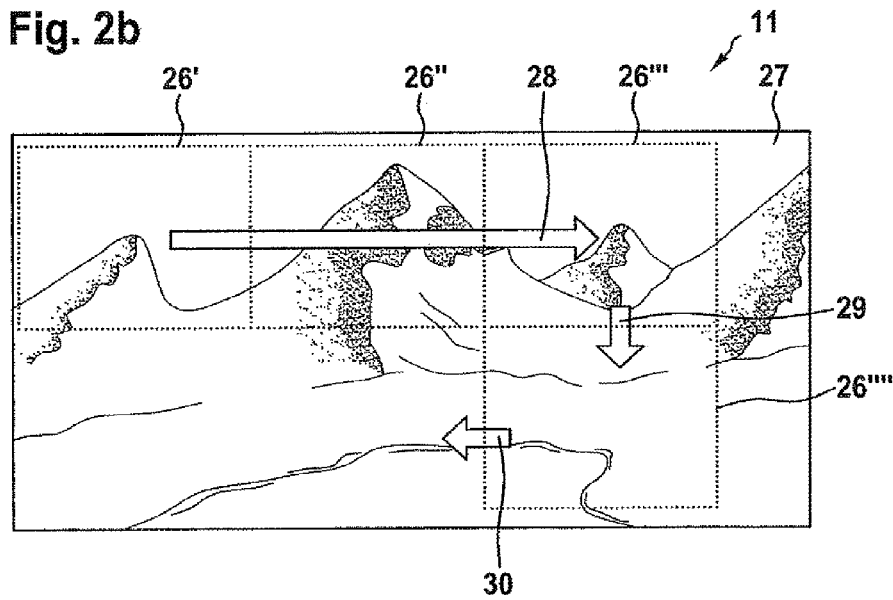
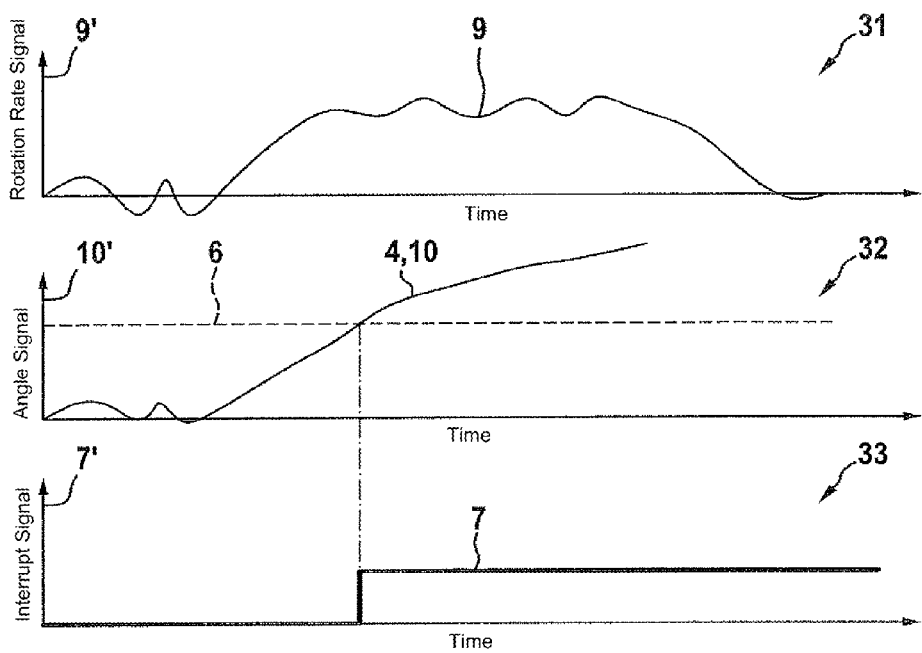

METHOD FOR OPERATING A SENSOR SYSTEM AND SENSOR SYSTEM

BACKGROUND INFORMATION

DE 195 19 488 A1 refers to a rotation rate sensor having a first and a second vibrating mass, the first and the second vibrating masses each being excited into a working vibration with the aid of excitation means. If there is now a rate of rotation perpendicular to the working vibrations, then Coriolis forces act on the first and the second vibrating masses. In each instance, the Coriolis forces deflecting the first and second vibrating masses perpendicularly to the working vibrations and perpendicularly to the rate of rotation. These Coriolis deflections of the first and second vibrating masses are each capacitively detected, using evaluation means, and correspondingly differentially evaluated to determine a rate of rotation.

SUMMARY OF THE INVENTION

Example embodiments of the present invention provide a sensor system and a method for operating a sensor system, which have an advantage over the related art, in that an interrupt signal, which is used to directly control an electronic component coupled to a rotation rate sensor, is generated as a function of the rotation rate measured by the rotation rate sensor. Thus, for example, the presence of a particular minimum or maximum rotation rate, the swivel through a particular minimum or maximum rotational angle and/or the presence of a constant rate of rotation in a particular interval between two threshold values are advantageously detected, and the external component is advantageously controlled as a function of these information items. In this connection, the interrupt signal preferably includes a digital signal, which may advantageously allow the interrupt signal to be generated in the region of the rotation rate sensor and the interrupt signal to be evaluated in the region of the external component, using comparatively simple, cost-effective and space-saving electrical and/or electronic circuits. By this means, in particular, analog or digital transmission of the sensor signal, i.e., the actually measured rotation rate signals, to the external component is not necessary, since in many fields of application, the information whether, for example, a constant rotation rate, a particular rotation rate and/or a particular rotational angle is present is, alone, sufficient for the external component. Consequently, a large data bandwidth is also advantageously not required for the connection between the rotation rate sensor and the external component. The rotation rate sensor preferably includes a micromechanical rotation rate sensor, which has, particularly preferably, a silicon substrate and a seismic weight movably suspended with respect to the silicon substrate. In this context, the seismic weight acts as a Coriolis element and, using drive elements, is excited into a working vibration relative to the substrate, which means that, in response to the presence of a rate of rotation perpendicular to the working vibration, a deflection of the seismic weight relative to the substrate, as well as perpendicular to the working vibration and perpendicular to the rate of rotation, is generated due to Coriolis forces. This deflection is measured, in particular, capacitively and is a measure of the magnitude of the rate of rotation.

According to an example embodiment of the present invention, in a second method step, the sensor signal is compared to a second of the threshold values; and in a third method step, the interrupt signal is output as a function of the comparison of the sensor signal and a first of the threshold values, and as a function of the comparison of the sensor signal and the second threshold value. A constant rate of rotation is detectable in an advantageous manner, using the comparison of the sensor signal to both the first and the second threshold values. In so doing, it is detected, for example, if the sensor signal lies between the first and the second threshold values, in particular, over a defined time interval.

According to an example embodiment of the present invention, in the first method step, a sensor signal in the form of a rotation rate signal proportional to the rotation rate is generated, or a sensor signal in the form of an angle signal is generated, which is ascertained, in particular, by integrating the rotation rate signal with respect to time. Consequently, depending on the desired field of application, both the magnitude and the temporal change of the rotation rate, and the magnitude and the temporal change of the rotational angle, are advantageously retrievable.

According to an example embodiment of the present invention, in the third method step, the interrupt signal is output if it is detected, in the second method step, that the rotation rate signal and/or the magnitude of the rotation rate signal is between the first and the second threshold values. In this manner, the presence of an essentially constant rotation rate is signaled to the electronic component, which means that electronic component applications that are only executable in the case of an essentially constant rotation rate are executed as a function of the interrupt signal, i.e., only in response to a presence of the interrupt signal. In this context, the maximum allowable deviations from the constant rotation rate are adjustable by suitably selecting the first and second threshold values or by selecting the interval between the first and second threshold values.

According to an example embodiment of the present invention, in the third method step, the interrupt signal is output if it is detected, in the second method step, that the angle signal and/or the magnitude of the angle signal exceeds the first threshold value, the first threshold value spanning preferably between 80 degrees and 100 degrees, particularly preferably between 85 degrees and 95 degrees and especially preferably being 90 degrees. In this manner, it is signaled to the electronic component that the sensor system was rotated through a particular angle, which means that electronic component applications that are only implementable, or only should be implemented, in the case of such a rotation are executed as a function of the interrupt signal or only in response to the presence of the interrupt signal.

According to an example embodiment of the present invention, in a fourth method step, at least one further sensor signal is generated by the rotation rate sensor as a function of a further rotation rate measured about a further rotational axis; in a fifth method step, the at least one further sensor signal is compared to at least one further, first threshold value; and in a sixth method step, at least one further interrupt signal is output as a function of the comparison of the at least one further sensor signal and the at least one further, first threshold value. In the fifth method step, the at least one further sensor signal may be compared to at least one further, second threshold value; and in the sixth method step, the at least one further interrupt signal is preferably output as a function of the comparison of the at least one further sensor signal and the at least one further, first threshold value, and as a function of the comparison of the at least one further sensor signal and the at least one further, second threshold value. Therefore, rotation rates about additional rotational axes are advantageously considered. Thus, for example, an application of the electronic component is only implemented, if a constant rotation of the sensor system about a first axis is detectable and, simultaneously, it is ruled out that the sensor system is undergoing additional rotations about a second axis and a third axis independent of the first axis.

According to an example embodiment of the present invention, in a seventh method step, for controlling a pick-up function of an electronic component taking the form of a camera, the interrupt signal is used in such a manner that (a) the pick-up function is started by the interrupt signal when it is detected, in the second method step, that the rotation rate signal and/or the magnitude of the rotation rate signal is within an interval between the first and the second threshold values, and that (b) the pick-up function is stopped by the interrupt signal when it is detected, in the second method step, that the rotation rate signal and/or the magnitude of the rotation rate signal is outside of the interval between the first and the second threshold value. Preferably, the pick-up function is controlled as a function of the at least one further interrupt signal. For example, a panoramic picture may be taken by the camera where the interrupt signal starts the pick-up function of the camera, if a constant rotation rate about a first rotational axis (constant swivel movement of the camera by a user) is measured and, preferably, no rotation rates with respect to other rotational axes are measurable. The camera then picks up, in uniform time intervals, a plurality of images that are subsequently automatically merged along the swivel movement to form a larger panoramic picture. The camera preferably includes a digital camera, preferably a digital photo camera. Moreover, it is conceivable to use the method in connection with a, in particular, digital film camera, in which, using the interrupt signal, the pick-up function is only executable when a constant rotation rate and/or only small angular accelerations are present. In this manner, e.g., distorted and/or unclear shots resulting from overly rapid swivel movements of the camera may be prevented in a simple manner.

According to an example embodiment of the present invention, in a ninth method step, to control an image rotation function of an electronic component taking the form of a portable display device, the interrupt signal be used in such a manner, that the image rotation function is triggered by the interrupt signal when it is detected, in the second method step, that the angle signal and/or the magnitude of the angle signal exceeds the first threshold value. In this manner, it is possible, for example, to detect swiveling of the portable display device by essentially 90 degrees and, in this case, to trigger the image rotation function using the interrupt signal, in order that the display of the portable display device is also correspondingly rotated and user-friendly reading of the display is ensured in any arbitrary position of the portable display device (also referred to as "portrait-landscape changeovers"). The portable display device preferably includes a cellular phone, a PDA (personal digital assistant), a digital notebook or laptop, a digital music playback device (e.g., an MP3 player), a digital camera, an e-book (electronic book), a tablet PC or the like.

According to an example embodiment of the present invention, in a tenth method step, the interrupt signal is used for calibrating an electronic component taking the form of a sensor, a rotation of the sensor being signaled by the interrupt signal, and the sensor being calibrated in view of a measurement of the signaled rotation. Using a known movement, another sensor is advantageously calibratable by comparing the movement measured by the sensor to be calibrated to the known movement. In this connection, the presence of the known movement is indicated by the interrupt signal. The sensor to be calibrated preferably includes a position sensor and particularly preferably, a compass.

A sensor system including a rotation rate sensor and an electronic component coupled to the rotation rate sensor constitutes further subject matter of the present invention, the rotation rate sensor being calibrated for generating a sensor signal as a function of a rotation rate measured about a rotational axis, for comparing the sensor signal to at least one first threshold value and for outputting an interrupt signal to the electronic component as a function of the comparison of the sensor signal and the at least one first threshold value. Consequently, it is advantageously possible to control the electronic component or particular applications of the electronic component as a function of the sensor signal measured by the rotation rate sensor, where only the interrupt signal and, in particular, no physical sensor signals at all, have to be transmitted between the electronic component and the rotation rate sensor. Therefore, the necessary bandwidth of the connection between the electronic component and the rotation rate sensor is comparatively small. Furthermore, no complicated evaluation circuits are necessary. In order to realize the above-mentioned advantages, the sensor system is specially configured to implement the method of the present invention for operating the sensor system.

Exemplary embodiments of the present invention are represented in the drawing and explained more precisely in the following description.

BRIEF DESCRIPTION OF THE DRAWINGS

FIG. 1 shows a schematic plan view of a sensor system and a schematic representation of a method according to a first example embodiment of the present invention.

FIGS. 2a and 2b show schematic representations of a method according to a second example embodiment of the present invention.

FIGS. 3a, 3b and 3c show schematic representations of a method according to a third example embodiment of the present invention.

DETAILED DESCRIPTION

Figure 3B:
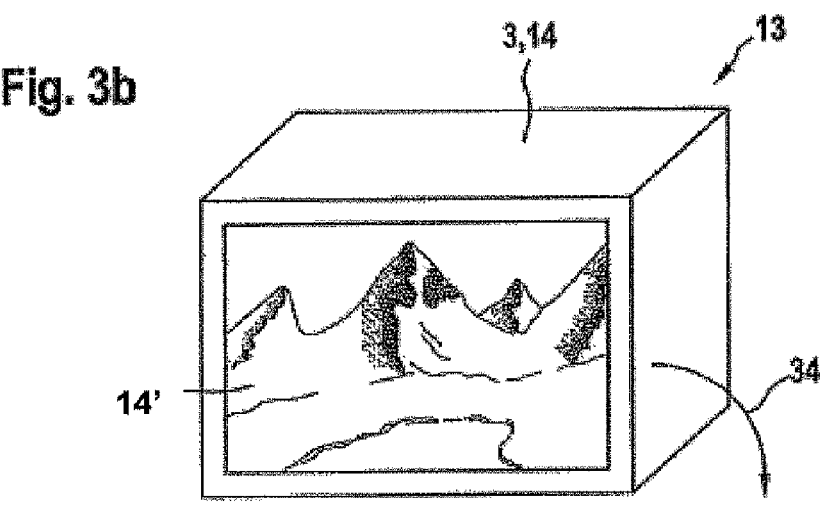

In the various figures, identical parts are always denoted by the same reference symbols and are therefore usually labeled or mentioned only once.

A schematic plan view of a sensor system 1 and a schematic representation of a method according to a first example embodiment of the present invention is represented in FIG. 1. Sensor system 1 includes a micromechanical rotation rate sensor 2 modeled only schematically and illustratively, as well as an electronic component 3. Rotation rate sensor 2 includes a substrate 20 and a seismic weight 21 movably suspended with respect to substrate 20 (often referred to as a Coriolis or sensor element, as well). Using capacitive drive units 22, seismic weight 21 is excited into a working vibration 23, which, in the present example, is directed parallelly to a major plane of extension 100 of substrate 20. In addition, drive units 22 include finger electrode structures 22' fixed to the substrate; counter-electrodes 22" of the seismic weight 21, which take the form of finger electrodes, extending in between finger electrode structures 22'. On the basis of electrostatic interaction between finger electrode structures 22' and counter-electrodes 22", an AC voltage applied on each side of seismic weight 21, in each case, between finger electrode structures 22' and counter-electrodes 22" generates a driving force on seismic weight 21, through which working vibration 23 is induced. If a rotation rate 5 is now present, which is directed perpendicularly to working vibration 23 and parallelly to major plane of extension 100, a Coriolis force acts on seismic weight 21 perpendicularly to major plane of extension 100, which means that a Coriolis deflection of seismic weight 21 perpendicular to major plane of extension 100 is caused. The Coriolis deflection is a measure of the rotation rate 5 to be measured and is capacitively measured via surface electrode elements 24, which are situated, for example, between seismic weight 21 and substrate 20. In a first method step, a sensor signal 4, which is a function of the Coriolis deflection, is generated and transmitted to a processing unit 25. In a second method step, processing unit 25 compares sensor signal 4, in each instance, to a first threshold value 6 and to a second threshold value 8. In this context, it is checked if sensor signal 4, i.e., rotation rate 5, is in an interval 12 between first and second threshold values 6, 8. If this condition is satisfied, then, in a third method step, an interrupt signal 7 is transmitted to electronic component 3. As soon as sensor signal 4, i.e., rotation rate 5, is outside of interval 12 again, interrupt signal 7 ceases to be transmitted.

It is also conceivable for rotation rate sensor 2 to be formed fundamentally differently from the rotation rate sensor 2 illustrated by way of example in FIG. 1. For example, another implementation may include a differentially operating rotation rate sensor 2 having two seismic weights 21 and/or having a multi-channel rotation rate sensor 2, which is provided for measuring a further rotation rate perpendicular to major plane of extension 100 and/or perpendicular to working vibration 23. In addition, it is conceivable to produce drive units 22 in the form of plate-type capacitor drives and the like.

Schematic representations of a method according to a second example embodiment of the present invention are provided in FIGS. 2a and 2b, the second example embodiment essentially corresponding to the first example embodiment described with respect to FIG. 1, the second example embodiment describing a practical application of the method of the present invention for operating a sensor system 1 in connection with an electronic component 3 taking the form of a camera. Two graphs are represented in FIG. 2a. A first of the graphs shows the time dependence of sensor signal 4, and the second of the graphs shows a signal characteristic 7' of interrupt signal 7 with respect to time. Sensor signal 4 includes a rotation rate signal 9, which is directly proportional to measured rotation rate 5. First and second threshold values 6, 8, which are constant with respect to time, are also illustrated in the diagram for the time dependence of sensor signal 4. It can be seen that interrupt signal 7 is switched on as soon as sensor signal 4 runs inside interval 12 between first and second threshold values 6, 8, and that interrupt signal 7 is switched off as soon as sensor signal 4 runs outside of interval 12 between first and second threshold values 6, 8. Therefore, interrupt signal 7 is a measure or indicator of whether an essentially constant rotation rate 5 is present; the deviations from constant rotation rate 5 that are still tolerated being adjustable by suitably selecting first and second threshold values 6, 8. In place of rotation rate signal 9, it is conceivable for merely the magnitude of rotation rate signal 9 to be considered. Interrupt signal 7 is then transmitted to electronic component 3 taking the form of the camera, and, in a seventh method step, a pick-up function 11 of the camera may be controlled as a function of interrupt signal 7. In this connection, image pick-up function 11 of the camera may be started as soon as interrupt signal 7 is present and stopped as soon as interrupt signal 7 is not present. In this manner, it is ensured that image pick-up function 11 is switched on only in response to the presence of an essentially constant rotation rate 5.

Pick-up function 11 is now described in further detail in view of FIG. 2b. FIG. 2b schematically illustrates a plurality of individual images 26', 26", 26''' against the background of a landscape panorama 27. Interrupt signal 7 is switched on during horizontal panning 28 of the camera, since simultaneously, within the scope of the second method step, a constant rotation rate 5 is detected during horizontal panning 28. Then, in the seventh method step, pick-up function 11 is started, and individual images 26', 26", 26''' are picked up by the camera in temporally constant intervals. These three individual images 26', 26", 26''' are later merged to form a large panoramic image.

During horizontal panning 28, it is optionally verified, in fourth and fifth method steps, that sensor system 1 is not moving about further rotational axes. In this connection, it is particularly checked that further sensor signals, which are a function of further rotation rates about the further rotational axes, lie below a further, first threshold value. In this particular, optional embodiment, interrupt signal 7 would preferably not only be switched off when sensor signal 4 is outside of interval 12, but also when further sensor signals lie above the further, first threshold values.

After third individual image 26''' is picked up, the viewfinder of the camera is no longer horizontally panned, but instead, a vertical tilting motion 29 is executed. Since horizontal panning motion 28 is stopped, sensor signal 4 now leaves interval 12 and interrupt signal 7 is switched off, so that image pick-up function 11 is also stopped. In a ninth method step, a further sensor signal is now compared to a further, first threshold value. In this context, the further sensor signal is a function of a further rotation rate about a further, horizontal rotational axis, the further rotation rate therefore being directly proportional to vertical tilting motion 29. In this connection, the further sensor signal includes an angle signal, which is ascertained by integrating the further rotation rate signal with respect to time. The further, first threshold value is now selected, such that, when the angle signal reaches the further, first threshold value, the viewfinder of the camera is tilted to the point where fourth individual image 26'''' attaches itself seamlessly to the bottom edge of third individual image 26'''. In this position, a uniform, horizontal, reverse panning motion 30 is started, which means that interrupt signal 7 is switched on again and the pick-up function of the camera is restarted. In this manner, a panoramic image having a plurality of rows may be automatically assembled from a plurality of individual images 26', 26", 26''', 26''''. All in all, a panoramic image may therefore be generated by a camera, the image coverage angle in the panoramic image being markedly less than what is necessary for the recording of the panoramic image using a single picture record. In this manner, for example, so-called angular images may be advantageously produced, which extend over a large angular range (e.g., 180° or 360° images).

Figure 3C:
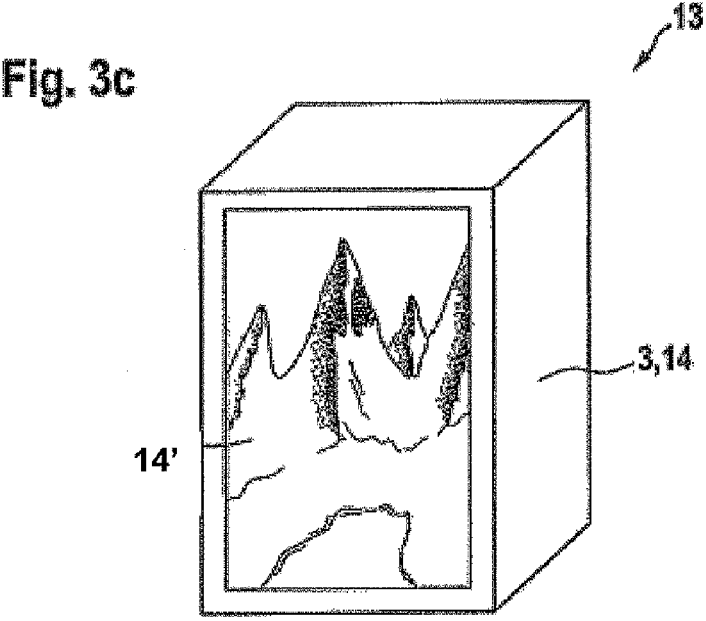

Schematic representations of a method according to a third example embodiment of the present invention are represented in FIGS. 3a, 3b and 3c, the third example embodiment essentially corresponding to the first specific embodiment described in view of FIG. 1, the third example embodiment describing a practical application of the method of the present invention for operating a sensor system 1 in connection with an electronic component 3 taking the form of a portable display device 14. Three graphs 31, 32, 33 are represented in FIG. 3a. First graph 31 shows a time characteristic of a rotation rate signal 9, which is directly proportional to measured rotation rate 5. Second graph 32 shows a time characteristic of sensor signal 4 in the form of an angle signal 10, angle signal 10 being ascertained by integrating rotation rate signal 9 shown in first graph 31, with respect to time. In the second method step, this angle signal 10 is compared to the first threshold value 6 illustrated in second graph 32. The time characteristic of signal path 7' of interrupt signal 7 is shown in third graph 33, interrupt signal 7 being switched off, as long as the angle signal 10 illustrated in second graph 32 lies below first threshold value 6, and interrupt signal 7 being switched on as soon as angle signal 10 exceeds first threshold value 6. In the present example, first threshold value 6 is approximately 90 degrees, so that interrupt signal 7 signals a 90-degree rotation of sensor system 1. In a ninth method step that is illustrated with the aid of FIGS. 3b and 3c, interrupt signal 7 is used, in this connection, to control an image rotation function 13. In FIG. 3b, the electronic component 3 illustrated as a portable display device 14 is illustrated in a first orientation. In this context, portable display device 14 shows a photo 14' by way of example. In FIG. 3c, the same portable display device 14 is represented in a second orientation that is tilted by 90 degrees in comparison with FIG. 3b. In this context, tilting 34 of portable display device 14 was signaled by interrupt signal 7, as described above, and using interrupt signal 7, image rotating function 13 was started, which, as a result of tilting 34 of display device 14, correspondingly rotates back the display of display device 14, i.e., photo 14', 90 degrees relative to display device 14. Consequently, the orientation of the display and of photo 14' relative to the gravitational field advantageously remains the same, although display device 14 was tilted 90 degrees. In this manner, the ease of operation of portable display device 14 is increased.

What is claimed is:

1. A method for operating a sensor system including a rotation rate sensor and an electronic component, the method comprising:
    generating, by the rotation rate sensor, a sensor signal as a function of a rotation rate measured about a rotational axis;
    comparing, by the rotation rate sensor, the sensor signal to at least one first threshold value;
    for controlling the electronic component, outputting, by the rotation sensor, an interrupt signal to the electronic component as a function of the comparison of the sensor signal and the at least one first threshold value,
    wherein one of: (a) the sensor signal is a rotation rate signal proportional to the measured rotation rate and the first threshold value is a rotation rate threshold value and (b) the sensor signal is an angle signal ascertained by integrating the rotation rate signal with respect to time and the first threshold value is an angle threshold value; and
    comparing the sensor signal to a second threshold value,
    wherein the outputting of the interrupt signal is performed as a function of the comparison of the sensor signal and the second threshold value in addition to the comparison of the sensor signal and the first threshold value,
    wherein the interrupt signal is output responsive to a detection that at least one of the rotation rate signal and a magnitude of the rotation rate signal is between the first and the second threshold values, and
    wherein as long as the sensor signal is between the first and second threshold values, the interrupt signal continuously stays on until the sensor signal is no longer between the first and second threshold values.

2. The method as recited in claim 1, wherein the interrupt signal is output responsive to a detection that at least one of the angle signal and a magnitude of the angle signal exceeds the first threshold value.

3. The method as recited in claim 2, wherein the first threshold value is a value between 80 degrees and 100 degrees.

4. The method as recited in claim 2, wherein the first threshold value is a value between 85 degrees and 95 degrees.

5. The method as recited in claim 2, wherein the first threshold value is 90 degrees.

6. The method as recited in claim 2, wherein: the electronic component is a display device; and an image rotation function of the display device is triggered by the interrupt signal responsive to the detection that at least one of the angle signal and the magnitude of the angle signal exceeds the first threshold value.

7. The method as recited in claim 6, wherein the display device is a portable display device.

8. The method as recited in claim 1, further comprising:
    generating, by the rotation rate sensor, at least one further sensor signal as a function of a further rotation rate measured about a further rotational axis;
    comparing the at least one further sensor signal to at least one further first threshold value and to at least one further second threshold value; and
    outputting at least one further interrupt signal as a function of (a) the comparison of the at least one further sensor signal and the at least one further first threshold value, and (b) the comparison of the a least one further sensor signal and the at least one further second threshold value.

9. The method as recited in claim 8, wherein:
    the electronic component is a camera;
    a pick-up function of the camera is started by the interrupt signal responsive to a detection that at least one of the rotation rate signal and the magnitude of the rotation rate signal is within an interval between the first and the second threshold values;
    the pick-up function is stopped based on the interrupt signal responsive to a detection that at least one of the rotation rate signal and the magnitude of the rotation rate signal is outside of the interval between the first and the second threshold values; and
    the pick-up function is further controlled as a function of the at least one further interrupt signal.

10. The method as recited in claim 1, wherein:
    the electronic component is a sensor to be calibrated;
    the interrupt signal signals a rotation of the sensor to be calibrated and is used for the calibration, the calibration being based on a measurement of the signaled rotation.

11. A sensor system comprising:
    an electronic component; and
    a rotation rate sensor to which the electronic component is coupled, and which is configured to:
    generate a sensor signal as a function of a rotation rate measured about a rotational axis;
    compare the sensor signal to at least one threshold value;
    wherein one of: (a) the sensor signal is a rotation rate signal proportional to the measured rotation rate and the first threshold value is a rotation rate threshold value and (b) the sensor signal is an angle signal ascertained by integrating the rotation rate signal with respect to time and the first threshold value is an angle threshold value;
    output an interrupt signal to the electronic component as a function of the comparison of the sensor signal and the at least one first threshold value; and
    compare the sensor signal to a second threshold value,
    wherein the outputting of the interrupt signal is performed as a function of the comparison of the sensor signal and the second threshold value in addition to the comparison of the sensor signal and the first threshold value,
    wherein the interrupt signal is output responsive to a detection that at least one of the rotation rate signal and a magnitude of the rotation rate signal is between the first and the second threshold values, and wherein as long as the sensor signal is between the first and second threshold values, the interrupt signal continuously stays on until the sensor signal is no longer between the first and second threshold values.

\* \* \* \* \*